US010019684B2

(12) United States Patent
Kurian et al.

(10) Patent No.: US 10,019,684 B2
(45) Date of Patent: Jul. 10, 2018

(54) ADAPTIVE ENTERPRISE WORKFLOW MANAGEMENT SYSTEM

(71) Applicant: BANK OF AMERICA CORPORATION, Charlotte, NC (US)

(72) Inventors: Manu Jacob Kurian, Dallas, TX (US); Sorin N. Cismas, Addison, TX (US); Paul Grayson Roscoe, Chester (GB)

(73) Assignee: BANK OF AMERICA CORPORATION, Charlotte, NC (US)

( * ) Notice: Subject to any disclaimer, the term of this patent is extended or adjusted under 35 U.S.C. 154(b) by 358 days.

(21) Appl. No.: 14/744,676

(22) Filed: Jun. 19, 2015

(65) Prior Publication Data
US 2016/0371622 A1    Dec. 22, 2016

(51) Int. Cl.
G06Q 10/00 (2012.01)
G06Q 10/06 (2012.01)

(52) U.S. Cl.
CPC ............... G06Q 10/06316 (2013.01)

(58) Field of Classification Search
CPC ........................................ G06Q 10/00–50/00
USPC ................................................. 705/7.11–7.42
See application file for complete search history.

(56) References Cited

U.S. PATENT DOCUMENTS

| | | | |
|---|---|---|---|
| 6,073,109 A * | 6/2000 | Flores | G06Q 10/06311 705/7.13 |
| 6,397,192 B1 * | 5/2002 | Notani | G06F 9/46 705/7.26 |
| 7,451,432 B2 * | 11/2008 | Shukla | G06F 8/36 717/105 |
| 8,335,773 B2 * | 12/2012 | Balko | G06F 8/00 707/694 |
| 8,782,201 B2 * | 7/2014 | Kephart | G06Q 10/06 705/7.28 |
| 8,799,174 B1 * | 8/2014 | Mitchell | G06Q 10/103 705/301 |
| 2004/0210607 A1 * | 10/2004 | Manchanda | G06F 17/30592 |
| 2006/0010195 A1 | 1/2006 | Mamou et al. | |
| 2006/0069717 A1 | 3/2006 | Mamou et al. | |
| 2007/0100892 A1 * | 5/2007 | Kephart | G06Q 10/06 |
| 2009/0063665 A1 | 3/2009 | Bagepalli et al. | |
| 2009/0125366 A1 * | 5/2009 | Chakraborty | G06Q 10/087 717/117 |
| 2009/0276771 A1 | 11/2009 | Nickolov et al. | |
| 2010/0153153 A1 * | 6/2010 | Balko | G06F 8/71 707/695 |

(Continued)

OTHER PUBLICATIONS

Müller, Robert, Ulrike Greiner, and Erhard Rahm. "Agentwork: a workflow system supporting rule-based workflow adaptation." Data & Knowledge Engineering 51.2 (2004): 223-256.*

(Continued)

Primary Examiner — Alan S Miller
(74) Attorney, Agent, or Firm — Michael A. Springs; Moore & Van Allen PLLC; James C. Edwards

(57) ABSTRACT

A centralized workflow management system is described that provides for the ability to manage workflows existing throughout a large enterprise regardless of the format of the workflow platform/system providing the workflows. The system and other embodiments provide for workflow extensibility, such that changes to existing workflows and/or addition of new workflows result in automatic adaption to all downstream and upstream workflows that are affected by the change or addition.

20 Claims, 4 Drawing Sheets

(56) References Cited

U.S. PATENT DOCUMENTS

| | | |
|---|---|---|
| 2013/0104236 A1 | 4/2013 | Ray et al. |
| 2013/0158964 A1* | 6/2013 | Hall .................. G06Q 10/0633 703/3 |
| 2014/0025426 A1* | 1/2014 | Doehring ........... G06Q 10/0633 705/7.27 |
| 2014/0201747 A1* | 7/2014 | Pattnaik .............. G06F 11/3006 718/101 |
| 2015/0188949 A1 | 7/2015 | Mahaffey et al. |

OTHER PUBLICATIONS

Reichert, Manfred, Thomas Bauer, and Peter Dadam. "Enterprise-wide and cross-enterprise workflow management: Challenges and research issues for adaptive workflows." (1999): 56-64.*

Lee, Kevin, et al. "Adaptive workflow processing and execution in pegasus." Concurrency and Computation: Practice and Experience 21.16 (2009): 1965-1981.1.*

\* cited by examiner

ADAPTIVE ENTERPRISE WORKFLOW MANAGEMENT SYSTEM

FIELD

In general, embodiments of the invention relate to management of workflows throughout an enterprise and, more particularly, a centralized workflow management system that provides for automatic downstream and upstream adaption of all dependent workflows, regardless of format, to occur in response to an addition of a new workflow, edit to an existing workflow or deletion of existing workflow.

BACKGROUND

In large enterprise businesses, such as financial institutions or the like, implementing new workflows (i.e., automated or manual procedures/processes conducted by the enterprise) or making changes to existing workflows can be a daunting task. This is because most of the workflows that are conducted within a large enterprise have upstream and/or downstream dependent workflows that are affected by changes to existing workflows and/or addition/deletion of workflows. In addition, most of the workflows within a large enterprise have internal rules and regulations, as well as, in some instances government standards and regulations which must be abided by when conducting the workflow and/or when making changes to the workflow. In specific instances, a change/edit to one workflow may be prohibited due to the change's effect on a downstream dependent workflow (e.g., the downstream workflow would no longer comply to internal rules/regulations and/or government standards or regulations) or a change/edit to one workflow may be acceptable but result in the non-compliance of one or more upstream dependent workflows. Moreover, workflow changes typically require various degrees of corporate approval (i.e., chains of approval) to effectuate the change, with chains of approval existing within each upstream and downstream dependent workflow. Even with the advent of automated systems for workflow management, the management of workflow changes in large enterprises is an exhaustive and time-consuming task.

In addition, in large enterprises many disparate workflow systems or platforms are implemented. Each of these workflow platforms may provide for a different format for hosting the workflows (e.g., standard markup language, such as HTML (HyperText Markup Language); a diagramming and vectors management application; or the like). The disparate formats of such workflow platforms provide an obstacle in importing and exporting workflows or portions of workflows from one workflow platform/system to another workflow platform/system. In most instances, no means exist to interchangeably move a workflow or a portion of a workflow from one platform/system to another/platform system without a redesign of the workflow to accommodate the format of the platform/system receiving the workflow.

Therefore, a new exists to develop systems, apparatus, computer program products, methods and the like that provide for a centralized workflow management system that provides for the ability to manage most, if not all, of the workflows existing throughout a large enterprise regardless of the format of the workflow platform/system providing the workflows. The desired systems and the like should provide for workflow extensibility, such that changes to existing workflows and/or addition of new workflows result in automatic adaption to all downstream and upstream workflows that are affected by the change or addition. Moreover, the desired systems and the like should provide for workflow extendibility, such that additions can be made to existing workflows.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for a centralized system for workflow management. The centralized nature of the system provides for the ability to manage all of the workflows existing throughout a large enterprise regardless of the format of the workflow platform/system providing the workflows. In this regard, the system herein described provides for existing workflows to be changed/edited and/or new workflows added (as well as deletion of workflows) and, as a result of such changes/additions, automatic adaption occurs within all downstream and upstream workflows that are affected by the change or addition. Adaption, as used herein, means that changes occur in the downstream and upstream workflows based on the changes to an existing workflow or addition of new workflow (or deletion of workflow). Such changes may include, but are not limited to, incorporating the changes or additional workflow into the dependent workflow and/or modifying the downstream or upstream dependent workflows to accommodate the changed or additional functionality of the related workflow. Moreover, the workflow management system herein described can accommodate the automatic adaption of workflows irrespective of the workflow platform/system that provides the dependent workflows. Thus, if the dependent workflow is hosted by a workflow system/platform that has a disparate format to the workflow being changed/added, the automatic adaption can still proceed absent a need for extensive redesign of the workflow or the like.

A system for adaptive workflow management throughout an enterprise defines first embodiments of the invention. The system includes a computing platform having a memory and at least one processor in communication with the memory. Additionally, the system includes a plurality of workflow platforms configured to provide/host for workflows to be implemented throughout the enterprise. Each of the workflow platforms/systems may be formatted differently. The system additionally includes a centralized workflow management module that is stored in the memory and executable by the processor. The module is configured to determine/detect an occurrence of one of (1) a new workflow being added to a first workflow platform from amongst the plurality of workflow platforms, or (2) edits to or deletion of an existing workflow within the first workflow platform. In response to the addition of the new workflow, or edits to or deletion of the existing workflow, the module is configured to automatically determine the upstream and the downstream dependent workflows affected by the new workflow, the edits to the existing workflow or the deletion of the existing workflow. The upstream and downstream dependent workflows may reside in workflow platforms that are formatted differently than the workflow platform hosting the workflow in which the change/addition occurred. In response to determining the upstream and downstream dependent workflows, the module is further configured to automatically adapt the upstream or downstream dependent workflows based on the new workflow or the edits to or the deletion of the existing workflow. The automatic adaption occurs irrespective of workflow platform format of the workflow being adapted. Thus, the workflow platform of the dependent workflows may be different from the workflow edited/added. Moreover, it should be noted that upstream and downstream dependent workflows are not limited to direct dependent workflows (i.e., workflows that require adaption based on the change/addition to the first workflow) but also include indirect upstream and downstream dependent workflows (i.e., workflows that require adaption based on the initial adaption of the direct dependent workflows).

In specific embodiments of the system, the centralized workflow management module is further configured to adapt by adding the new workflow (or a portion of the new workflow) or making the edits to at least a portion of the plurality of workflows having an upstream or downstream dependency from the new workflow. In such embodiments of the system, the centralized workflow management module is further configured to add the new workflow or make the edits by transforming the new workflow or edits to the existing workflow to a standardized format, such as an open format (e.g., XML or the like), and transforming the standardized format to a format supported by a corresponding workflow platform providing each of the plurality of workflows being adapted.

In further specific embodiments of the system, the centralized workflow management module is further configured to adapt the upstream or downstream dependent workflows by creating and accessing custom functions that call to the workflow platforms providing the upstream or downstream dependent workflows, wherein the functions are customized based on at least one of type of function being performed or a workflow platform format of the workflow platform providing the upstream or downstream dependent workflows. For example, the change to the first workflow may require a dependent workflow to provide data to the first workflow that was previously not required. In such an instance, the custom function may call to the dependent workflow requesting that a change be made to the dependent workflow such that the data will be transmitted to the first workflow. Additionally, in further related embodiments of the system, the centralized workflow management module is further configured to, in response adapting the upstream and downstream workflows, receive parameters and outputs associated with adapting the upstream and downstream workflows and respond to the parameters and outputs.

In still further specific embodiments of the system, the centralized workflow management module is further configured to automatically identify changes to external governance standards or internal procedures effecting workflows, and, in response to identifying the changes, affect the occurrence of one of (1) the new workflow being added to the workflow management system, or (2) the edits to or the deletion of an existing workflow within the workflow management system. In this regard, the change to internal procedures/regulations and/or governance standards serves as a trigger for automatically providing for a new workflow or edits/changes to an existing workflow.

In additional specific embodiments of the system the workflow management system is further configured to automatically identify invalid and non-compliant workflows and, in response to identifying invalid or non-compliant workflow, affect the occurrence of one of (1) the new workflow being added to the workflow management system, or (2) the edits to or the deletion of an existing workflow within the workflow management system. In this regard, the identification of an invalid or non-compliant workflow may serves as the trigger for automatically providing for a new workflow or edits/changes to an existing workflow.

In additional embodiments of the system, the workflow management system is configured to perform pre-checks prior to accepting a new workflow or edits to an existing workflow. The pre-checks insure that the new workflow or edits to an existing workflow comply with external governance regulations/standards and/or internal procedures/regulations or is otherwise acceptable. Additionally, the workflow management system may be configured to perform self-checks prior to implementing a downstream or upstream adaption to insure that the changes to the dependent workflow comply with external governance regulations/standards and/or internal procedures/regulations or is otherwise acceptable. The pre-checks and/or self-checks may identify failure points (i.e., dependent workflows that will become non-compliant if the addition/change occurs or prohibit the change from occurring), and (2) weak control points (e.g., workflows that will access unnecessary or redundant data as a result of the change/addition). In response to identifying failure points and weak control points, the system may be configured to generate and communicate alerts to predetermined system administration.

In additional embodiments of the system the workflow management system further comprises a graphical user interface (GUI) configured to allow a user to create the new workflows and make the edits to the existing workflow. For example, the GUI may be configured to allow for drop/drag functionality or cut/paste functionality as a means of adding, arranging or changing elements/processes to a workflow. In specific embodiments of the system, in response to creating the new workflow or making the edits to the existing workflow, the system automatically creates or updates one or more of requisite details associated with the new workflow or the edits to the existing workflow or tables associated the new workflow or the edits to the existing workflow. In related embodiments of the system, the graphical user interface is further configured to allow the user to select one or more processes within the first workflow and insert the selected processes into a second workflow. The insertion of the selected processes includes automatically performing predetermined compliance checks to insure that the second workflow is capable of receiving the selected processes. In similar related embodiments of the system, the graphical user interface is further configured to allow the user to select one or more processes within a first workflow, remove the selected processes from the first workflow and create a second workflow that comprises the selected processes. The removal of the selected processes from the first workflow and creation of second workflow includes automatically performing predetermined compliance checks to insure that the first workflow is capable of removing the processes and the second workflow is capable of receiving the selected processes.

A method for adaptive workflow management throughout an enterprise defines second embodiments of the invention. The method includes determining, by a computing device processor, an occurrence of one of (1) a new workflow being added to a first workflow platform, or (2) edits to or deletion of an existing workflow within the first workflow platform. The method further includes, in automatic response to the addition of the new workflow, or edits to or deletion of the existing workflow, determining, by a computing device processor, upstream and downstream dependent workflows affected by the new workflow, the edits to the existing workflow or the deletion of the existing workflow. One or more of the dependent workflows reside in a workflow platform that is different than the first workflow. Additionally, the method includes in automatic response to determining the upstream and downstream dependent workflows, adapting the upstream or downstream dependent workflows based on the new workflow or the edits to or the deletion of the existing workflow. The automatic adaption occurs irrespective of workflow platform format of the workflow being adapted.

A computer program product including a non-transitory computer-readable medium defines third embodiments of the invention. The computer-readable medium includes a first set of codes for causing a computer to determine an occurrence of one of (1) a new workflow being added to a first workflow platform, or (2) edits to or deletion of an existing workflow within the first workflow platform. Additionally, the computer-readable medium includes a second set of codes for causing a computer to, in automatic response to the addition of the new workflow, or edits to or deletion of the existing workflow, determine all upstream and downstream dependent workflows affected by the new workflow, the edits to the existing workflow or the deletion of the existing workflow. One or more of the dependent workflows reside in a workflow platform that is different than the first workflow. In addition, the computer-readable medium includes a third set of codes for causing a computer to, in automatic response to determining the upstream and downstream dependent workflows, adapting the upstream or downstream dependent workflows based on the new workflow or the edits to or the deletion of the existing workflow, wherein the automatic adaption occurs irrespective of workflow platform format of the workflow being adapted.

Thus, systems, apparatus, methods, and computer program products herein described in detail below provide for a centralized system for workflow management. The centralized aspect of the system provides the ability to manage all of the workflows existing throughout a large enterprise regardless of the format of the workflow platform/system providing the workflows. In this regard, the systems herein described provide for existing workflows to be changed/edited, new workflows added or obsolete workflows deleted and, as a result of such changes/additions/deletions, automatically adapt all downstream and upstream workflows that are affected by the change or addition.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
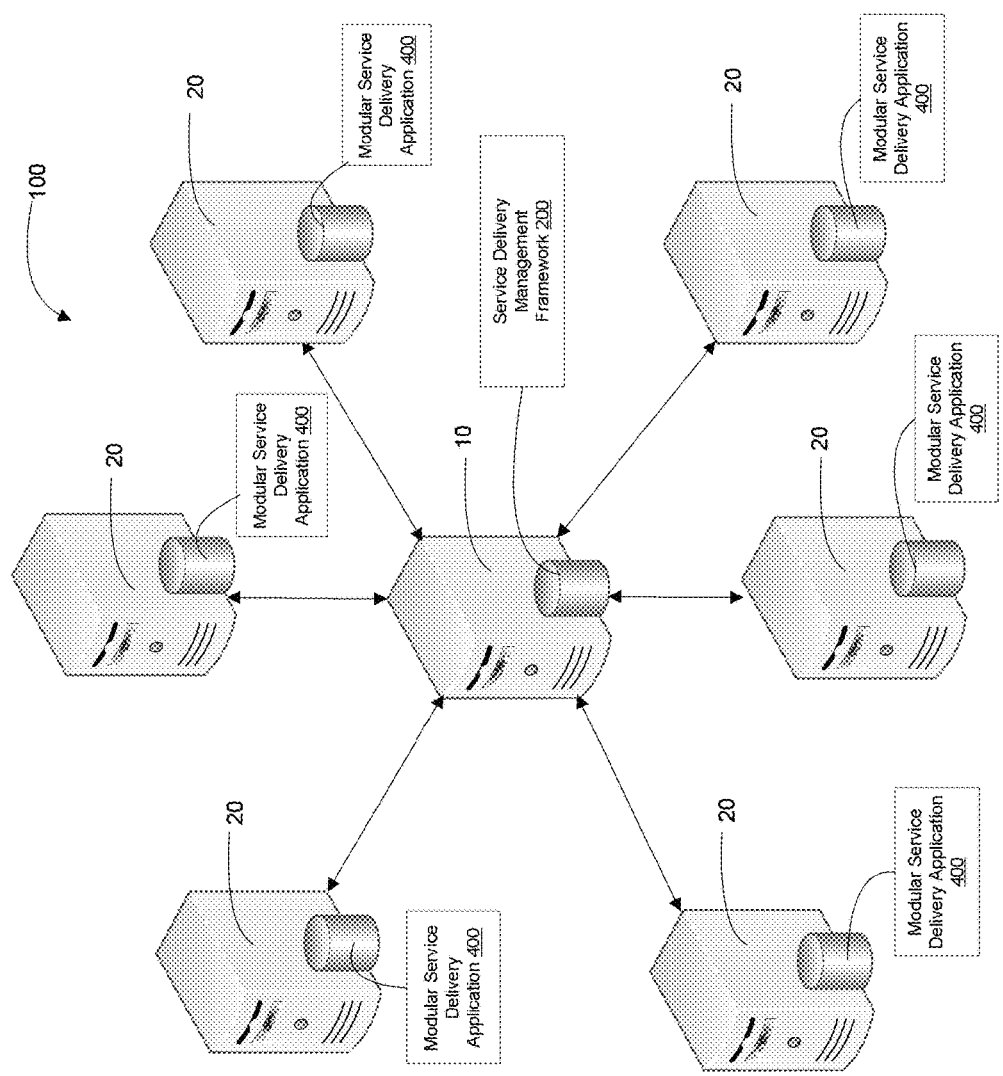
Figure 2:
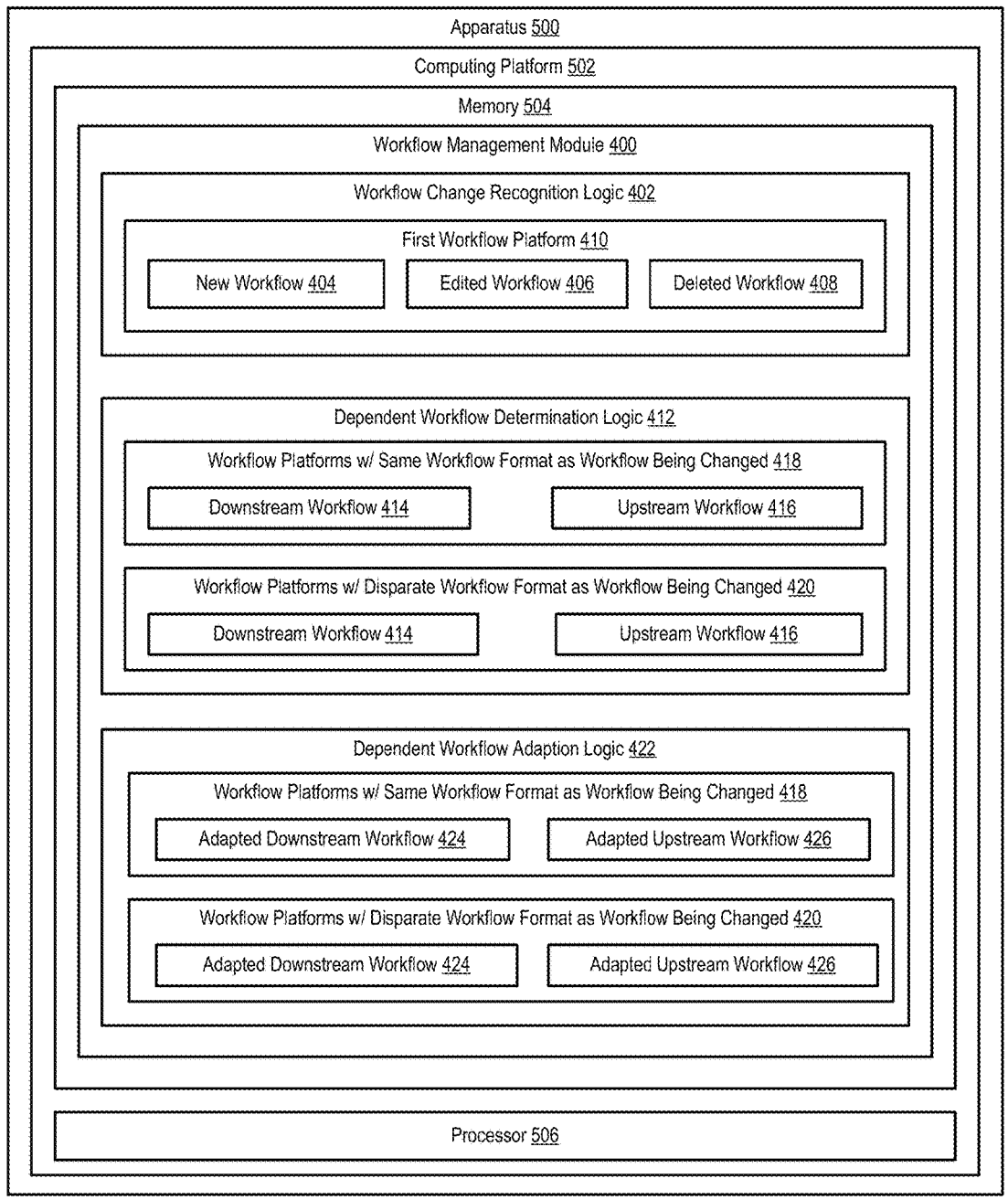
Figure 3:
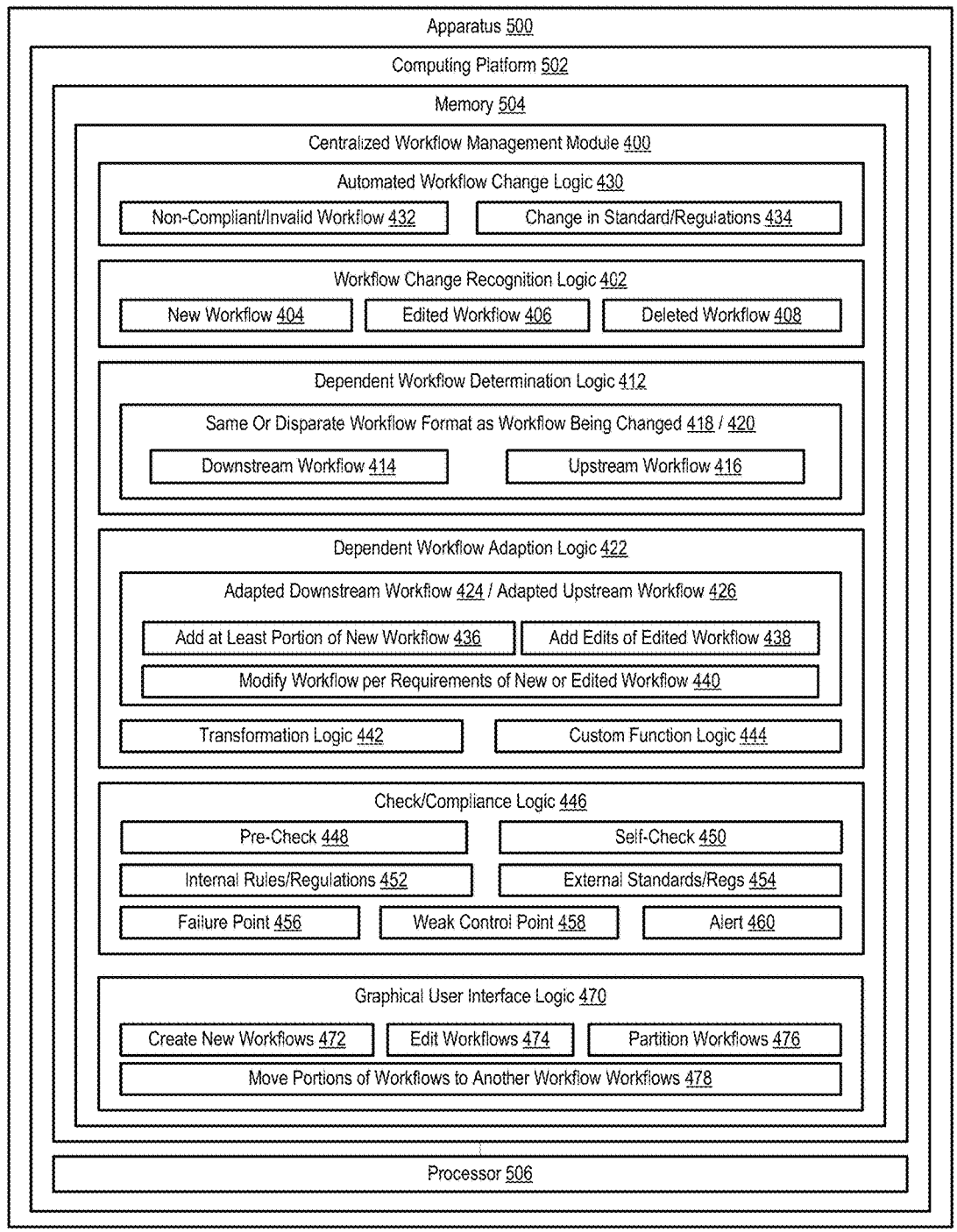
Figure 4:
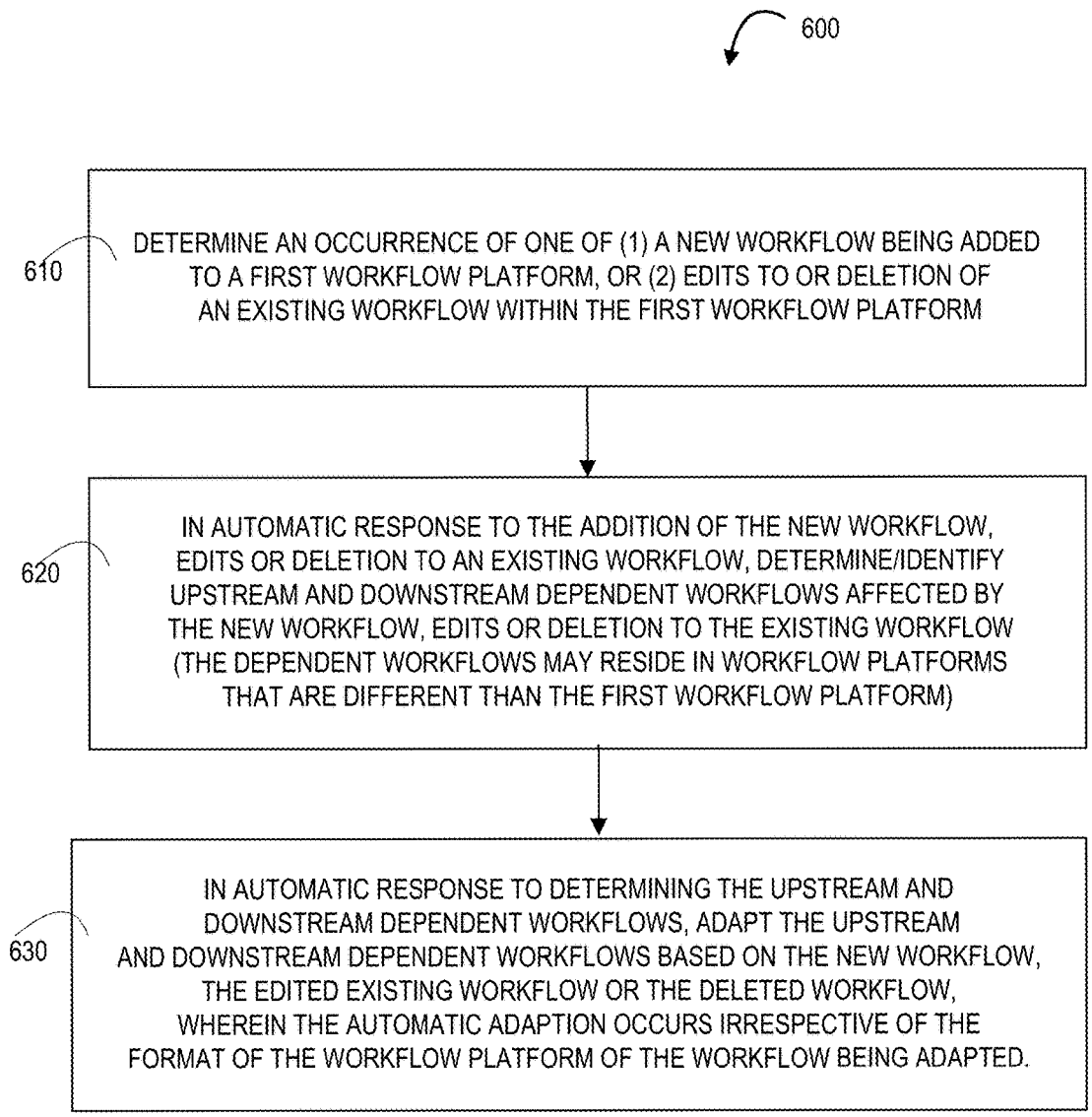

Having thus described embodiments of the invention in general terms, reference will now be made to the accompanying drawings, which are not necessarily drawn to scale, and wherein:

FIG. 1 provides a schematic diagram of a system for enterprise-wide service delivery including centralized workflow management, in accordance with embodiments of the present invention;

FIG. 2 provides a block diagram of an apparatus within a system for centralized workflow management, in accordance with embodiments of the present invention;

FIG. 3 provides a more detailed block diagram of an apparatus within a system for centralized workflow management, in accordance with embodiments of the present invention; and FIG. 4 provides a flow diagram of a method for centralized workflow management, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for a centralized system for workflow management. The centralized nature of the system provides for the ability to manage all of the workflows existing through a large enterprise regardless of the format of the workflow platform/system providing the workflows, the protocols used to communicate within the platforms/systems and/or the hardware/servers on which the workflow platforms reside.

Specifically, the centralized workflow management system herein described provides for existing workflows to be changed/edited, new workflows to added and/or obsolete workflows to be deleted and, as a result of such changes/additions/deletions, automatic adaption occurs within all downstream and upstream workflows that are affected by the change or addition. Adaption, as used herein, means that changes occur in the downstream and upstream workflows based on the changes to an existing workflow or addition of new workflow (or deletion of workflow). Such changes may include, but are not limited to, incorporating the changes or additional workflow into the dependent workflows and/or modifying the downstream or upstream dependent workflows to accommodate the changes or additional functionality of the related workflow. For example, adaption may include requiring a dependent workflow to perform an additional action/process (e.g., provide a specific data item to the workflow that was previously not required).

Moreover, the workflow management system herein described can accommodate automatic adaption of workflows irrespective of the workflow platform/system that provides the dependent workflows. Thus, if the dependent workflow is hosted by a workflow system/platform that has a disparate format to the workflow being changed/added, the automatic adaption can still proceed absent a need to extensive redesign of the workflow or the like. Such is format-agnostic adaption is accomplished by transforming/exporting the edits/addition to an open format, such as XML or the like and subsequently transforming/importing the edits/additions into the desired format of the dependent or desired workflow. Additionally, format-agnostic adaption can is accomplished by creating custom cross-functions that call on another disparate workflow platform to integrate in the new or edited workflow into the workflow residing in the disparate workflow platform.

Further embodiments of the invention provide for non-compliant (i.e., internal noncompliance and/or external noncompliance) or invalid/obsolete workflows to be identified and act as triggers for automatic generation of new workflows or changes to existing workflows.

Additionally, embodiments of the invention provide for both pre-checks and self-checks to insure the viability of making automated changes to dependent workflows. Pre-checks occur prior to implementing a new or edited workflow and self-checks occur prior to adapting a downstream or upstream dependent workflow. As a result of the pre-checks and/or self-checks failure points may be identified in the chain dependency or the like which prohibit workflows from being implemented or weak control points may be identified which may not prohibit workflows from being implemented but identify weakened controls (e.g., unnecessary day exchanges, redundant data exchanges or the like). Identification of failure points, weak control pints or other pre-check and/or self-check results may be automatically communicated to designated administrators in the form of an alert or the like.

In additional embodiments of the invention, the workflow management module herein described provides for a Graphical User Interface (GUI) in which a user can create new workflows, edit existing workflows and the like by conventional drag and drop commands, cut and paste commands or the like Referring to FIG. 1, a schematic diagram is provided of a system 100 for providing technology/OS-agnostic and protocol-agnostic delivery of services within an enterprise, in accordance with embodiments of the present invention. One of the services that may be delivered by system 100 is the workflow management system module herein described at length below. The system 100 is configured as a hub-and-spoke model, in which the hub server 10 provides for management of the service delivery system via service delivery management framework 200 and the spoke servers 20, implemented throughout the enterprise, are deployed with a modular service delivery application 400. The service delivery application 400 is an open source based web services application and, as such, can be deployed and/or executed on any type of server (technology-agnostic) executing any type of operating system (OS-agnostic). The modular nature of the application means that the service delivery system is extensible; as additional services are added new modules within the application 400 may be added/plugged-in into the application 400. As such, the present invention provides a holistic approach to service delivery that results in an enterprise-wide solution for service delivery.

In specific embodiments of the invention, the service delivery application 400 includes a workflow management module (shown and described in FIGS. 2 and 3) that is configured to provide protocol-agnostic, format-agnostic workflow management throughout the enterprise. Since the workflow management module is configured as an open source application that is protocol-agnostic, deployment and use of workflow management throughout most, if not all, of the enterprise's servers eliminates the need to deploy, maintain and configure compatibility amongst multiple different protocol-specific workflow management systems or provide for manual workflow redesign in the event of format or protocol differences.

Service delivery application 400 provides uniform management for all of the services delivered by service delivery application 400. In this regard, service delivery application 400 includes core services that act as a unifier to provide umbrella-like management over security, governance (approvals and exceptions), provisioning (new modules and revisions to modules), auditing, tracking, reporting and the like. Such uniformity in management provides efficiency and eliminates the need to resolve conflicts that arise in disparate applications having distinct security, governance, provisioning protocols, rules and regulations.

Referring to FIG. 2, a block diagram is presented of apparatus 500 within a system for centralized workflow management, in accordance with embodiments of the present invention. The centralized aspect of the workflow management system provides for interchangeable workflows throughout an enterprise in which the workflows are hosted by disparate workflow platforms and/or systems, such that changes to or addition of a workflow within the centralized management system results in automatic adaption (i.e., incorporation of the changes/additions and/or changes to meet the requirements of the initial change/addition) of all upstream and downstream dependent workflows. The term "workflow" as used herein includes any work process or procedure implemented within a business entity. A workflow characteristically includes a series of steps, events, processes or the like that are conducted in order to complete the workflow.

Conventionally, business entities impose compliance requirements on a workflow such that a workflow must meet internally imposed rules, regulations and the like in order for a workflow to be implemented. Additionally, certain business entities have external compliance requirements associated with workflows, such as government regulations and/or standards that require compliance in order for the workflow to be implemented. In order to insure compliance to internal and/or external compliance requirements, procedures (i.e., compliance workflows) are undertaken that typically require a chain of approval (i.e., multiple corporate level approvals) for changes to workflows, addition of new workflows, elimination of invalid or obsolete workflows and the like.

Apparatus 500 includes computing platform 502 that includes a memory 504 and a processor 506, which is in communication with memory 504. Memory 504 stores workflow management module 400 that executable by processor 506 and configured to provide centralized and auto-adaptive workflow management throughout an enterprise. Workflow management module 400 includes workflow change recognition logic 402 that is configured to determine the occurrence of a new workflow 404 being added to a first workflow platform/system 410 from amongst the plurality of workflow platforms/systems that exist throughout the enterprise. In addition, workflow change recognition logic 402 is configured to determine the occurrence of edits (i.e., changes, modifications or the like) to an existing workflow 406 within first workflow platform/system 410 or deletion of an existing workflow 408 of within first workflow platform/system 410.

Additionally, workflow management module 400 includes dependent workflow determination logic 412 that is configured to, in automatic response to the addition of a new workflow 404, edit to an existing workflow 406 or deletion of an existing workflow 408, determine upstream and downstream dependent workflows 416, 414 affected by the new workflow 404, edited workflow 406 or deleted workflow 408. The upstream dependent workflows 416 are workflows that require adaption based on the change (edit, modification, deletion) of the underlying (i.e., parent) workflow. Downstream dependent workflows 414 are workflows that must be adapted in order to effectuate the change to the underlying workflow. The upstream dependent workflows 416 and/or the downstream dependent workflows 414 may reside in workflow platforms that have the same format 418 as the workflow that has been changed or is being changed (i.e., the new, edited or deleted workflow). Additionally, the upstream dependent workflows 416 and/or the downstream workflows 414 may reside in workflow platforms that have a different format 420 as the workflow that has been changed or is being changed. The upstream and downstream dependent workflows 416, 414 may be determined based on a mapping of dependent workflows or, in other embodiments, dependencies may be determined dynamically at the time of the change.

In addition, workflow management module 400 includes dependent workflow adaption logic 422 that is configured to, in automatic response to determining the upstream and downstream dependent workflows 416, 414, adapt the upstream and downstream dependent workflows 424, 426 based on the new workflow 404, the edited workflow 406 or the deleted workflow 408. Adaption may include, but is not limited to, incorporating all or a portion of the new workflow 404 into the dependent workflow 414, 416, incorporating all or a portion of the edited workflow into the dependent workflow 414, 416, modifying or deleting the dependent workflow 414, 416 based on the deleted workflow 408, modifying/changing the dependent workflow 414, 414 based on the requirements of the new workflow 404 or edited workflow 406, or the like. The automatic adaption occurs irrespective of the format of workflow platform of the dependent workflow. In this regard, in the event that a least a portion of the new workflow 404 or edited workflow 406 is being incorporated within a dependent workflow having a disparate format, the portion of the new or edited workflow 404, 406 that is being incorporated may be transformed to a standard format, such as an open source format (e.g., XML or the like) and subsequently transformed from the standard format to the appropriate format of the dependent workflow 414, 416.

FIG. 3 provides a more detailed block diagram of an apparatus 500 within a system for centralized workflow management, in accordance with embodiments of the present invention. In addition to providing greater detail, FIG. 3 highlights various alternate embodiments of the invention. The apparatus 500 may include one or more of any type of computing device, such as a server or the like. The present apparatus and methods can accordingly be performed on any form of one or more computing devices.

The apparatus 500 includes computing platform 502 that can receive and execute algorithms, such as routines, and applications. Computing platform 502 includes memory 504, which may comprise volatile and non-volatile memory, such as read-only and/or random-access memory (RAM and ROM), EPROM, EEPROM, flash cards, or any memory common to computer platforms. Further, memory 504 may include one or more flash memory cells, or may be any secondary or tertiary storage device, such as magnetic media, optical media, tape, or soft or hard disk. Moreover, memory 504 may comprise cloud storage, such as provided by a cloud storage service and/or a cloud connection service.

Further, computing platform 502 also includes processor 506, which may be an application-specific integrated circuit ("ASIC"), or other chipset, processor, logic circuit, or other data processing device. Processor 506 or other processor such as ASIC may execute an application programming interface ("API") (not shown in FIG. 3) that interfaces with any resident programs, such as centralized workflow management module 400 and routines, sub-modules associated therewith or the like stored in the memory 504 of the apparatus 500.

Processor 506 includes various processing subsystems (not shown in FIG. 3) embodied in hardware, firmware, software, and combinations thereof, that enable the functionality of apparatus 500 and the operability of the apparatus on a network. For example, processing subsystems allow for initiating and maintaining communications and exchanging data with other networked devices, such as hub server (10 of FIG. 1). For the disclosed aspects, processing subsystems of processor 506 may include any subsystem used in conjunction with workflow management module 400 and related algorithms, sub-algorithms, modules, sub-modules thereof.

Computer platform 502 may additionally include communications module (not shown in FIG. 3) embodied in hardware, firmware, software, and combinations thereof, that enables communications among the various components of the apparatus 500, as well as between the other networked devices. Thus, communication module may include the requisite hardware, firmware, software and/or combinations thereof for establishing and maintaining a network communication connection. Such as communications between different workflow platforms/systems.

As previously discussed in relation to FIG. 2, the memory 504 of apparatus 500 stores workflow management module 400 that executable by processor 506 and configured to provide centralized and auto-adaptive workflow management throughout an enterprise, in accordance with embodiments of the present invention.

In specific embodiments of the invention, the workflow management module 400 includes automated workflow change/generation logic 430 that is configured to identify non-compliant or invalid workflows 432 and/or changes to external governance standards/regulations and/or internal procedures 434 and, in response to identifying the changes or non-compliances, automatically generate a new workflow 404, and make edits to an existing workflow 406 and/or delete an existing workflow 408. The logic 430 is configured to determine the non-compliance or why the workflow is invalid and make the necessary additions/edits to affected workflows that will resolve the non-compliance/invalid workflow issue. Moreover, the logic 430 is configured to determine the impact of changes to external standards/regulations and/or internal procedures on the workflows and make the necessary additions/edits to workflows. It should be noted that changes/additions are automatically made to those workflows that are directly affected (e.g., the invalid/non-compliant workflow), as well as, the workflows that are indirectly affected (i.e., the upstream and downstream dependent workflows).

As previously noted, workflow management module 400 includes dependent workflow adaption logic 422 that is configured to, in automatic response to determining the upstream and downstream dependent workflows 416, 414, adapt the upstream and downstream dependent workflows 424, 426 based on the new workflow 404, the edited workflow 406 or the deleted workflow 408. Adaption may include, but is not limited to, incorporating all or a portion of the new workflow 436 into the dependent workflow 414, 416, incorporating all or a portion of the edited workflow 438 into the dependent workflow 414, 416, modifying/changing the dependent workflow 440 based on the requirements of the new workflow 404 or edited workflow 406, or the like. The automatic adaption occurs irrespective of the format of workflow platform of the dependent workflow. In this regard, dependent workflow adaption logic 422 may include transformation logic 442 that is configured to transform the new or edited workflow 404, 406 to a standard format, such as an open source format (e.g., XML or the like) and subsequently transform from the standard format to the appropriate format of the dependent workflow 414, 416. Moreover, dependent workflow adaption logic 422 may include custom function logic 444 that is configured to create custom functions that call to disparate workflow platforms/systems. The custom functions may be created dynamically, on-the-fly or a database of custom functions may be provided. The custom functions may be "customized" based on the function required (specific to action/change required of a dependent workflow) and/or the format of the disparate workflow platform/system.

Additionally, in specific embodiments of the invention workflow management module 400 includes check/compliance logic 446 that is configured to insure that a workflow addition, change or deletion is valid and/or compliant. In this regard, the check/compliance logic 446 may be configured to perform pre-checks 448 prior to adding a new workflow, editing an existing workflow and/or deleting an existing workflow. The pre-check serves to verify that any pre-requisites associated with the addition, change or deletion are met, including, but not limited to, compliance with internal rules and procedures 452 and/or external governance standards and regulations 454. In addition, the check/compliance logic 446 may be configured to perform self-checks 450 prior to adapting an upstream or downstream dependent workflow. The self-check serves to verify that any pre-requisites associated with the addition, change or deletion are met, including, but not limited to, compliance with internal rules and procedures 452 and/or external governance standards and regulations 454. Pre-checks 448 and/or self-checks 450 are configured to identify failure points 456 (i.e., steps within the workflow or dependencies that would become non-compliant if the addition, changes or deletion occurs) and/or weak control points (e.g., steps or dependent workflows that marginalize data, include unnecessary or redundant data or the like). Identification of failure points 456 and/or weak control points 458 may trigger alerts 460 that communicated to predetermined workflow administrators. In response to receiving an alert, a workflow administrator may mitigate/resolve the failure point 456 and/or weak control point 458 or may override the failure point 456/weak control point 458 with proper approval. It should be noted that the workflow management module 400 may also be configured to communicate other alerts and/or notifications, such as alerts/notifications that notify designated workflow personnel of added new workflows, edits to existing workflows, deletion of existing workflows, as well as adaption by upstream and/or downstream dependent workflows.

Moreover, workflow management module 400 includes graphical user interface (GUI) logic 470 that is configured to present a user with a GUI that is allows the user to create a new workflow 472, edit workflows 474, partition/divide workflows 476 or the like. The GUI(s) may be configured to allow for the user to create new workflows or make edits using conventional drop and drag commands, cut and paste commands or the like. Partitioning of a workflow allows a user to select a portion of an existing workflow and divide the existing workflow into two separate workflows (i.e., the selected portion of the workflow becoming a new workflow). In addition, the GUI(s) are configured to allow a user to select one or more steps, events, processes within a specified workflow and automatically import or copy the selected steps, events or processes to another workflow, irrespective of the formats of the workflow platforms hosting the importing and exporting workflows. Partitioning workflows, creating new workflows and/or importing portions of one workflow into another workflow automatically trigger performance of compliance checks (i.e., a pre-check) to insure that validity and compliance of the changes.

In response to creating a new workflow or making edits to an existing workflow the module 400 is configured to capture metadata associated with details surrounding adding of the new workflow, or editing to an existing workflow and store the metadata in a corresponding workflow database. As such, the module 400 is configured to track changes performed to workflows and compile a historical record of the additions, deletions and/or changes.

Referring to FIG. 4, a flow diagram is presented of a method 600 for automated adaptive workflow management in an enterprise, in accordance with embodiments of the present invention. At Event 610, the occurrence of a (a) new workflow 404 being added to a first workflow platform/system from amongst the plurality of workflow platforms/systems that exist throughout the enterprise, (b) edits (i.e., changes, modifications or the like) to an existing workflow within first workflow platform/system or (c) deletion of an existing workflow of within first workflow platform/system is determined At Event 620, in automatic response to the addition of a new workflow, edit to an existing workflow or deletion of an existing workflow, determine upstream and downstream dependent workflows that are affected by the new workflow, edited workflow or deleted workflow are determined. The upstream dependent workflows are workflows that require adaption based on the change (edit, modification, deletion) of the underlying (i.e., parent) workflow. Downstream dependent workflows are workflows that must be adapted in order to effectuate the change to the underlying workflow. The upstream dependent workflows and/or the downstream dependent workflows may reside in workflow platforms that have the same format as the workflow that has been changed or is being changed (i.e., the new, edited or deleted workflow). Additionally, the upstream dependent workflows and/or the downstream workflows may reside in workflow platforms that have a different format as the workflow that has been changed or is being changed. The upstream and downstream dependent workflows may be determined based on a mapping of dependent workflows or, in other embodiments, dependencies may be determined dynamically at the time of the change.

At Event 630, in automatic response to determining the upstream and downstream dependent workflows, the upstream and downstream dependent workflows are adapted based on the new workflow, the edited workflow or the deleted workflow. Adaption may include, but is not limited to, incorporating all or a portion of the new workflow into the dependent workflow, incorporating all or a portion of the edited workflow into the dependent workflow, modifying or deleting the dependent workflow based on the deleted workflow, modifying/changing the dependent workflow based on the requirements of the new workflow or edited workflow, or the like. The automatic adaption occurs irrespective of the format of workflow platform of the dependent workflow. In this regard, in the event that a least a portion of the new workflow or edited workflow is being incorporated within a dependent workflow having a disparate format, the portion of the new or edited workflow that is being incorporated may be transformed to a standard format, such as an open source format (e.g., XML or the like) and subsequently transformed from the standard format to the appropriate format of the dependent workflow.

Thus, systems, apparatus, methods, and computer program products described above provide for a centralized system for workflow management. The centralized aspect of the system provides the ability to manage all of the workflows existing throughout a large enterprise regardless of the format of the workflow platform/system providing the workflows. In this regard, the system herein described provides for existing workflows to be changed/edited, new workflows added or obsolete workflows deleted) and, as a result of such changes/additions/deletions, automatically adapt all downstream and upstream workflows that are affected by the change or addition.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for protocol-agnostic and format-agnostic adaptive workflow management throughout an enterprise, the apparatus comprising:
   a computing platform having a memory and at least one processor in communication with the memory;
   a plurality of workflow platforms configured to provide for workflows to be implemented throughout the enterprise;
   a centralized workflow management module stored in the memory, executable by the processor, and configured to:
      identify, automatically, at least one of: (i) invalid and non-compliant workflows and (ii) changes to governance standards or internal procedures associated with an enterprise;
      affect an occurrence of one of (1) a new workflow being added to a first workflow platform from amongst the plurality of workflow platforms, or (2) edits to or deletion of an existing workflow within the first workflow platform, comprising:

determining an impact of the invalid and non-compliant workflows or the changes to governance standards or internal procedures; and generating, automatically, the new workflow or the edits or deletion of the existing workflow to resolve the impact of the invalid and non-compliant workflows or the changes to governance standards or internal procedures;

in automatic response to the addition of the new workflow, or edits to or deletion of the existing workflow, determine upstream and downstream dependent workflows affected by the new workflow, the edits to the existing workflow or the deletion of the existing workflow, based on a mapping of the dependent workflows;

in response to determining that one or more of the dependent workflows reside in a second workflow platform that has a format which is different than that of the first workflow platform, transform the new workflow or edits to the existing workflow into a predetermined standardized format; and in automatic response to determining the upstream and downstream dependent workflows, adapt the upstream and downstream dependent workflows based on the new workflow or the edits to or the deletion of the existing workflow, wherein the automatic adaption occurs irrespective of workflow platform format of the workflow being adapted, wherein adapting the upstream and downstream dependent workflows comprises transforming the new workflow or edits to the existing workflow in the standardized format to the format associated with the second workflow platform.

2. The system of claim 1, wherein the centralized workflow management module is further configured to adapt by adding the new workflow or making the edits to at least a portion of the plurality of workflows having an upstream or downstream dependency from the new workflow.

3. The system of claim 2, wherein the predetermined standardized format is an XML format.

4. The system of claim 1, wherein the centralized workflow management module is further configured to adapt the upstream or downstream dependent workflows by creating and accessing custom functions that call to the workflow platforms providing the upstream or downstream dependent workflows, wherein the functions are customized based on at least one of type of function being performed or a workflow platform format of the workflow platform providing the upstream or downstream dependent workflows.

5. The system of claim 4, wherein the centralized workflow management module is further configured to, in response adapting the upstream and downstream workflows, receive parameters and outputs associated with adapting the upstream and downstream workflows and respond to the parameters and outputs.

6. The system of claim 1, wherein the workflow management system further comprises a graphical user interface module configured to allow a user to create the new workflows and make the edits to the existing workflow and, in automatic response to creating the new workflow or making the edits to the existing workflow, creates or updates one or more of requisite details associated with the new workflow or the edits to the existing workflow or tables associated the new workflow or the edits to the existing workflow.

7. The system of claim 6, wherein the graphical user interface is further configured to allow the user to select one or more processes within a first workflow and insert the selected processes into a second workflow, wherein insertion of the selected processes includes automatically performing predetermined compliance checks to insure that the second workflow is capable of receiving the selected processes.

8. The system of claim 6, wherein the graphical user interface is further configured to allow the user to select one or more processes within a first workflow, remove the selected processes from the first workflow and create a second workflow that comprises the selected processes, wherein removal of the selected processes from the first workflow and creation of second workflow includes automatically performing predetermined compliance checks to insure that the first workflow is capable of removing the processes and the second workflow is capable of receiving the selected processes.

9. The system of claim 1, wherein the workflow management system is further configured to implement pre-checks prior to occurrence of the creation of the new workflow or edits to or deletion of existing workflows to insure that the new workflow or edits to deletion of existing workflows meet pre-requisites and are compliant with predetermined rules and governance standards.

10. The system of claim 9, wherein implementing pre-checks further comprises implementing pre-checks to identify at least one of (1) failure points within the workflow management system, and (2) weak control points within the workflow management system and the workflow management system is further configured, in response to identifying failure points and weak control points, generate and communicate alerts to predetermined system administration.

11. The system of claim 1, wherein the workflow management system is further configured to, prior to adapting the upstream and downstream workflows, implementing self-checks to insure that the adaption of the upstream and downstream workflow meet predetermined rules and governance standards.

12. The system of claim 11, wherein implementing the self-checks further comprises implementing self-checks to identify at least one of (1) failure points within the workflow management system, and (2) weak control points within the workflow management system and the workflow management system is further configured, in response to identifying failure points and weak control points, generate and communicate alerts to predetermined system administration.

13. A method for protocol-agnostic and format-agnostic adaptive workflow management throughout an enterprise, the method comprising identifying, automatically, at least one of: (i) invalid and non-compliant workflows and (ii) changes to governance standards or internal procedures associated with an enterprise;

affecting, by a computing device processor, an occurrence of one of (1) a new workflow being added to a first workflow platform, or (2) edits to or deletion of an existing workflow within the first workflow platform, comprising:

determining an impact of the invalid and non-compliant workflows or the changes to governance standards or internal procedures; and generating, automatically, the new workflow or the edits or deletion of the existing workflow to resolve the impact of the invalid and non-compliant workflows or the changes to governance standards or internal procedures;

in automatic response to the addition of the new workflow, or edits to or deletion of the existing workflow, determining, by a computing device processor, upstream and downstream dependent workflows affected by the new workflow, the edits to the existing workflow or the deletion of the existing workflow, based on a mapping of the dependent workflows;

in response to determining that one or more of the dependent workflows reside in a second workflow platform that has a format which is different than that of the first workflow platform, transforming the new workflow or edits to the existing workflow into a predetermined standardized format; and in automatic response to determining the upstream and downstream dependent workflows, adapting the upstream and downstream dependent workflows based on the new workflow or the edits to or the deletion of the existing workflow, wherein the automatic adaption occurs irrespective of workflow platform format of the workflow being adapted, wherein adapting the upstream and downstream dependent workflows comprises transforming the new workflow or edits to the existing workflow in the standardized format to the format associated with the second workflow platform.

14. The method of claim 13, wherein adapting further comprises at least one of adding the new workflow or making the edits to at least a portion of the plurality of workflows having an upstream or downstream dependency from the new workflow.

15. The method of claim 14, wherein the standardized format is an XML format.

16. The method of claim 13, wherein adapting the upstream or downstream dependent workflows further comprises creating and accessing custom functions that call to the workflow platforms providing the upstream or downstream dependent workflows, wherein the functions are customized based on at least one of type of function being performed or a workflow platform format platform of the workflow platform providing the upstream or downstream dependent workflows.

17. A computer program product for protocol-agnostic and format-agnostic adaptive workflow management throughout an enterprise, comprising:

a non-transitory computer-readable medium comprising:

a first set of codes for causing a computer to identify, automatically, at least one of: (i) invalid and non-compliant workflows and (ii) changes to governance standards or internal procedures associated with an enterprise;

a second set of codes for causing a computer to affect an occurrence of one of (1) a new workflow being added to a first workflow platform, or (2) edits to or deletion of an existing workflow within the first workflow platform, comprising:

determining an impact of the invalid and non-compliant workflows or the changes to governance standards or internal procedures; and generating, automatically, the new workflow or the edits or deletion of the existing workflow to resolve the impact of the invalid and non-compliant workflows or the changes to governance standards or internal procedures;

a third set of codes for causing a computer to, in automatic response to the addition of the new workflow, or edits to or deletion of the existing workflow, determine all upstream and downstream dependent workflows affected by the new workflow, the edits to the existing workflow or the deletion of the existing workflow, based on a mapping of the dependent workflows;

a fourth set of codes for causing a computer to, in response to determining that one or more of the dependent workflows reside in a second workflow platform that has a format which is different than that of the first workflow platform, transform the new workflow or edits to the existing workflow into a predetermined standardized format; and a third set of codes for causing a computer to, in automatic response to determining the upstream and downstream dependent workflows, adapting the upstream and downstream dependent workflows based on the new workflow or the edits to or the deletion of the existing workflow, wherein the automatic adaption occurs irrespective of workflow platform format of the workflow being adapted, wherein adapting the upstream and downstream dependent workflows comprises transforming the new workflow or edits to the existing workflow in the standardized format to the format associated with the second workflow platform.

18. The computer program product of claim 17, wherein adapting further comprises at least one of adding the new workflow or making the edits to at least a portion of the plurality of workflows having an upstream or downstream dependency from the new workflow.

19. The computer program product of claim 17, wherein the standardized format is an XML format.

20. The computer program product of claim 17, wherein adapting the upstream or downstream dependent workflows further comprises creating and accessing custom functions that call to the workflow platforms providing the upstream or downstream dependent workflows, wherein the functions are customized based on at least one of type of function being performed or a workflow platform format platform of the workflow platform providing the upstream or downstream dependent workflows.

* * * * *